J. B. Root,
Rotary Engine,
No. 14778,    Patented Apr. 29, 1856.
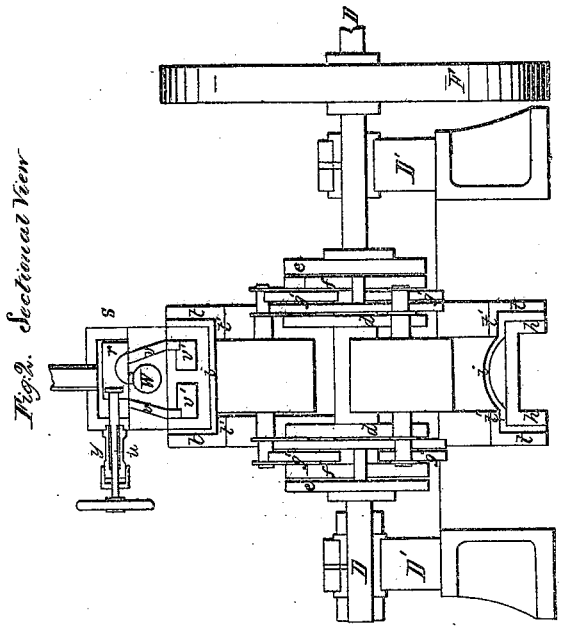
Fig. 2. Sectional View
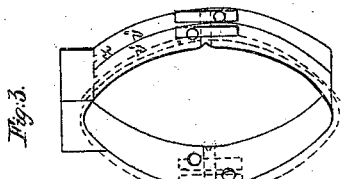
Fig. 3.
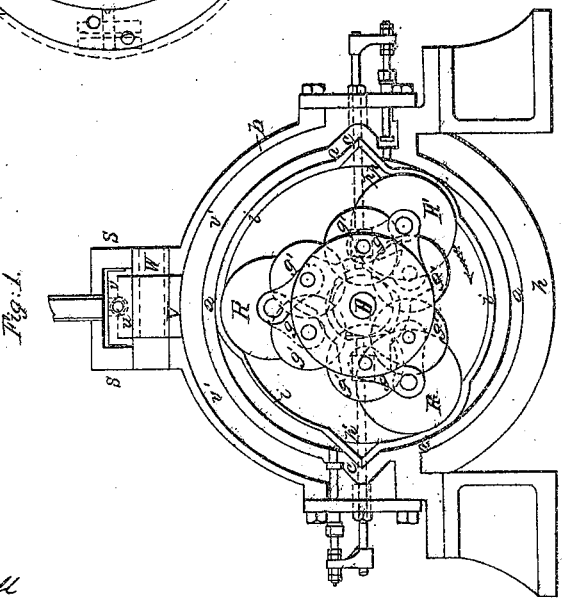
Fig. 1.
Witnesses:
T. D. Hall
Inventor:
John B Root

UNITED STATES PATENT OFFICE.

JOHN B. ROOT, OF BROOKLYN, NEW YORK.

ROTARY STEAM-ENGINE.

Specification of Letters Patent No. 14,778, dated April 29, 1856.

*To all whom it may concern:*

Be it known that I, JOHN B. ROOT, of Brooklyn, in the county of Kings and State of New York, have invented a new and useful Improvement in Rotary Engines, and that the following is a full, true, and exact description thereof, reference being had to the drawings accompanying and making part of this specification.

In the drawings Figure I, represents a cross vertical section of the engine. Fig. II, represents a longitudinal vertical section at right angles to section of Fig. I. Fig. III, represents a view of the steam passages and ports upon the exterior of the cylindrical case.

The engine is constructed with a main shell or case forming a hollow cylinder, as seen in the drawing Fig. I, at $a, a, a, a$. Upon the outside of this cylinder is constructed another shell or case $b, b$, concentric with the first, and forming a chamber between the two, the ends being cast solid, and a wall or partition being made so as to divide this chamber into two equal passages extending the whole circumference of the engine. A portion of this outer case may be dispensed with when only two or three piston rollers are used.

At the center of the inner cylinder I place the axle or driving shaft D, supported by the pillow blocks D' D'. To this shaft are attached two disks or plates $d, d$, Fig. II. Upon this shaft are also placed two other disks or plates $e, e$, at equal distances from $d, d$. The plates $d, d$, are connected together by a cylinder or collar fitting the axle between them, and the plates and collar are fixed firmly to each other and may be cast in one piece; they are fitted so as to turn freely upon the axle D. Next to plates $e, e$, are placed two plates $f, f$, being either in the form of disks extending out as far as the peripheries of $e, e$, or having arms of a similar length. These plates are keyed and fastened firmly to the axle D. Between the plates or disks $d, e, d, e$, are placed pairs of friction rollers $g', g'$. The pairs corresponding in number to the number of gudgeons of the main or driving rollers hereinafter described. The friction rollers are not placed in the same plane or line, but so that their planes or sides, if extended, would just pass by each other.

The main or driving rollers or frictions R, R, R', are constructed so as to turn upon and touch the lining of the inner shell $a, a$, and extend quite across its surface, and these rollers have gudgeons which rest or turn upon the pairs of friction rollers intended to receive them. These gudgeons pass through holes in the ends of two arms or plates of metal $g, g$, the other ends of which arms or plates of metal are secured—the one to one axle of each pair of friction rollers—the other to the axle of the other roller of the same pair. It will follow, since one of each of these pairs of arms is fixed to the stationary plates $f, f$, and the other of the same pair of arms $g$, is fixed to the movable disks, that if the movable disks are turned on the shaft they will draw closer together or separate the friction rollers of each pair according to the direction in which the movable plates are turned; and hence, according as the friction rollers are nearer together or wider apart with the main or piston rollers be carried close to the lining of the shell $a, a$, or withdrawn from it toward the central shaft.

Upon the inner surface of the cylinder $a, a$, I place a strip of india rubber $i\ i$ vulcanized and of strength and thickness proportioned to the pressure of steam to be used. Notches or recesses $c, c$, are made in the surface of the inner cylinder $a, a$ where the ends of the rubber meet, across the jaws of which and over the ends of the rubber are placed an adjustable bar or plate $p, p'$, of sufficient width and thickness to neatly cover the recess and at the same time when screwed down to firmly fix the ends of the rubber so that no steam can pass, and at the same time not interfere with the piston rollers as they revolve. The india rubber is fastened so as to be steam tight at the ends of the cylinder by being brought over the ends of the cylinders and then secured by a flat ring or circular plate $t$, bolted or secured upon the cylinder ends; this ring or plate having a projection or shoulder $t'$ fitting closely upon the rubber a short distance within the cylinder but so as to clear the ends of the rollers R, R, R'.

The steam is admitted under the rubber through ports in the inner cylinder. One of these ports must be placed above and close to the stop bar $p'\ p'$ which stops the continuation of the space under the rubber; the other port must be below and close to this stop bar but must open from the chamber or passage adjoining that from which the port above the bar opens. These passages or chambers are seen in the drawing Fig. III, and each chamber or passage must extend continuously around the cylinder or as far as the steam ports on either side of the cylinder where there are but two stop bars and three rollers as in the drawing. In Fig. III $v'$, $v'$ are the steam passages or chambers separated by the dividing wall $z$. These passages or chambers take the steam from the steam chests through the passages $v$ $v$ as seen in Fig. II. The steam chest $s$, $s$, is placed upon the top of the outer case; the passage of the steam into the one chamber or the other is regulated by a slide $r$ (Fig. II) which is adjusted by a rod $u$, passing through a stuffing box $y$, by which rod the slide can be drawn so as to let the steam into the one passage and port or the other and so control the direction of the rotation of the engine: the position of the steam ports being such that when the piston rollers are moving in one direction one half of the ports are introducing the steam under the rubber behind the rollers, while the other half are carrying off the steam from before the rollers to the exhaust; and when the piston rollers rotate in the opposite direction, the steam is introduced into those ports which before opened to the exhaust, and is carried off through those ports by which before it was introduced.

In starting the engine, the process is as follows. The roller $R'$, being in advance of the opening or port below the stop bar $p$, the steam is let into the chamber or passage connected with this port; the steam passing through this port under the rubber behind the roller $R'$, carries it forward in the direction indicated by the arrow, the roller carrying around with it the driving shaft D, to which it is attached. The roller $R'$, in passing the bar $p'$, loses the steam pressure by the steam escaping out of the opening at the bottom of the chamber to which the roller has passed, and into the passage communicating with the exhaust $w$, as soon as the roller $R'$, passes the stop bar $p'$, it again takes the steam behind it from the steam port above the stop bar on this side. The other rollers take and lose the steam in the same manner.

To reverse the engine the slide $r$, is moved so as to let the steam into the passage and ports from which before it was shut off, and through which it before passed to the exhaust.

By this arrangement of having three or more piston rollers, and letting the steam under the rubber at and through the ports placed at intervals around the cylinder, the steam acts upon the rollers at opposite point in the cylinder, thereby relieving the shaft from side pressure and friction; and the steam space between the rubber and the inner face of the cylinder can be divided into as many spaces as is desirable by the cross or stop bars, and adapting the number of piston rollers and passages and ports to the increased number of spaces, in the manner above described; and by this contrivance the power and speed of the engine may be greatly increased without increasing the size of the cylinder.

It is not necessary that the steam chest be placed upon the top of the engine; it may be placed wherever convenient, if the necessary connections with the steam passages and ports is preserved. The number of rollers (pistons) may be increased to four, five or six, in which case the ports must be increased in number to three, four or five pairs as the case may be. When india rubber of considerable thickness and strength is used, it should be placed on to the cylinder so as to stand a little out from it.

Having thus described my invention and manner of constructing and using the same, what I claim as my invention and desire to secure by Letters Patent is—

1. The contrivance of the steam ports, passages and stop bars arranged in connection with the piston rollers as above described so as to let the steam in upon the rubber at different and opposite sides of the cylinder at as many places as the number of rollers used shall require, thus acting upon the rollers from different and opposite points; thereby relieving the center shaft from side pressure and friction; and also increasing the power of the engine with the increase of the number of steam ports and piston rollers.

2. I also claim the arrangement and device of the movable plates $d$, $d$, and the stationary plates $f$, and cellar with the friction rollers $y'$, and metallic bars or arms $g$, for the purpose of adjusting the piston rollers in the manner and for the purposes above described.

JOHN B. ROOT.

Witnesses:
GEORGE W. FOX,
RICHARD WINNE.